Jan. 21, 1964 J. S. KURTZ 3,118,425
EGG PROTECTOR
Filed May 31, 1962

INVENTOR.
JOHN S. KURTZ

BY

ATTORNEYS 3,118,425
EGG PROTECTOR
John S. Kurtz, Ephrata, Pa., assignor to Automatic Poultry Feeder Company, Zeeland, Mich., a corporation of Michigan
Filed May 31, 1962, Ser. No. 199,123
3 Claims. (Cl. 119—48)

This invention relates to nests for fowl, and more particularly to a removable egg shield for nests having an egg roll-out opening.

Automated poultry farming today often includes at least semi-automatic egg gathering apparatus where banks of nests are arranged adjacent an egg conveyor at the front or back of the nest housing. Each nest includes a bottom which slopes toward an egg roll-out opening to the conveyor, to constantly cause laid eggs to roll out through the opening onto the conveyor, and thence to a conveyor gathering location. A complex arrangement of conveyor belts, elevators and tables may be involved in this egg transportation system.

Eggs on the conveyor are not normally accessible to birds on the outside of the nest. However, as the eggs pass by the nests on the conveyor, they ordinarily can be reached by a bird in the nest. The bird extends its head downwardly and outwardly through the roll-out opening and pecks at the passing eggs. Loss of eggs due to puncture or breakage by the birds is costly. Further, an egg punctured or broken on the conveyor causes a messy and odorous situation in the conveyor complex.

Another difficulty associated with egg conveyors involving birds in the nest occurs when a bird happens to die in the nest. Often the feet of the dead bird protrude out the roll-out opening and block the conveyor to thereby cause eggs to pile up at this location. This completely disrupts the automatic system and can cause serious losses unless spotted quickly.

It is therefore an object of this invention to provide a unique shield means for roll-out nests, to prevent access of birds to eggs through egg roll-out openings, while still allowing proper removal of eggs laid in the nest. The shield prevents the birds from pecking eggs passing on the conveyor. Further, it prevents the feet of a dead bird in the nest from blocking the conveyor.

It is another object of this invention to provide an insertable and removable shield means for roll-out nests, especially adapted to nests having insert bottoms. The shield means can be inserted or removed without removal of bolts or other fasteners. It is simple in construction and can be manufactured relatively inexpensively out of sheet metal or equivalent materials. It does not interfere with the laying bird nor with the eggs. It is especially adaptable to quickly assembled nests having removable insert components.

These and other objects of this invention will be apparent upon studying the following specification in conjunction with the drawings in which.

Basically, the inventive egg shield means has a shielding panel projecting inwardly of the nest from the nest wall having an egg roll-out opening therein. The shield means preferably comprises a generally V-shaped element, with one leg forming the shield panel extending diagonally inwardly and downwardly of the nest over the opening, and the other leg being a vertical support means adjacent the wall of the nest. The support panel preferably comprises a pair of legs astraddle an opening coinciding with the roll-out opening. The shield means is especially useful with nests having an insert bottom with upturned side flanges. The vertical support leg of the shield can then be slidably inserted between the nest insert and the nest back wall, and the outer edge of the shield panel can rest on the upturned side flanges.

Figure 1:
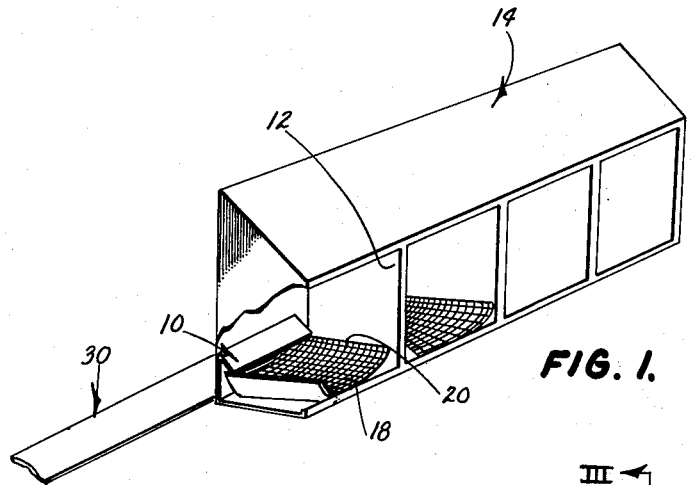
FIG. 1 is a perspective view of a nest housing including a plurality of individual nests, one of which is partially broken away to show the novel shield.
Figure 2:
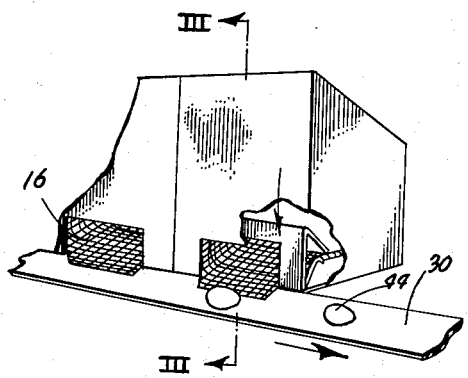
FIG. 2 is a fragmentary perspective view of the back of the nest housing in FIG. 1 with the back partially broken away to reveal the novel shield means.

Referring now to the drawings, the inventive shield means 10 is there shown installed in the end individual nest 12 of nest housing 14. Each of the nests includes an opening allowing a bird to enter and leave, and includes an egg roll-out opening 16, shown here on the back of the nest (FIG. 2). The egg roll-out opening and the fowl entry opening may be on the same wall of the nest.

Figure 4:
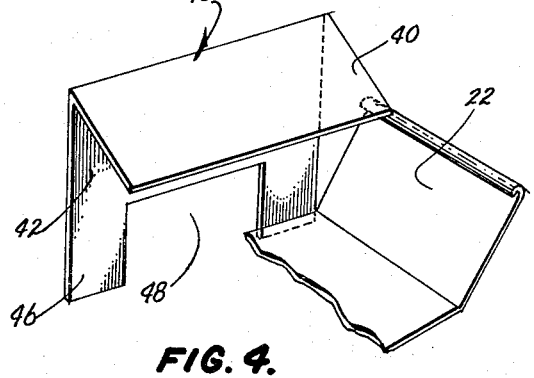
FIG. 4 is a fragmentary perspective enlarged view of the novel shield means shown in its supported position behind and atop the contoured insert of a nest.

Within each nest is a nest bottom 18 which preferably comprises a contoured bottom having upturned side flanges 20. This nest bottom is preferably of the insert type disclosed and claimed in United States Patent No. 3,046,940 (Serial No. 78,625). It preferably includes a lower forming element 22, for example of sheet metal (FIG. 4) and a wire mesh element secured in spaced relationship on top of element 22. The nest bottom surface is generally sloped towards outlet opening 16 so that eggs laid in the nest will roll across the mesh and out opening 16 onto a conveyor means 30. This conveyor preferably includes a belt of jute or the like to carry eggs through a conveyor system to a central gathering location.

Preferably, the wire mesh extends out over the belt 30 at 23 to insure smooth rolling out of the nest. Conveyor 30, although preferably a belt-type conveyor, may of course be of any various types. It may even include a generally slanted surface to cause eggs to roll to one end of the nest housing as needed.

Figure 3:
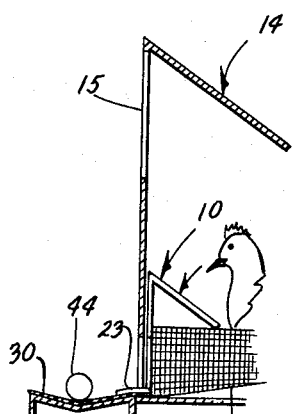
FIG. 3 is a sectional, elevational enlarged view taken on plane III—III of FIG. 2.

The novel shield, which is preferably formed of a sheet material such as sheet metal, comprises a generally V-shaped element having a shielding panel 40 and a support panel 42. Support leg panel 42 is preferably inserted between the back edge of the nest bottom insert and the back wall 15 of the nest housing 14, so as to be removable at any time as desired. Since leg 42 is behind the generally upturned edges 22 of the sheet metal element of the nest bottom insert, it is supported in this vertical position. The shielding panel 40 extends inwardly and downwardly of the nest so as to protrude diagonally toward the nest bottom insert. Its outer edge contacts the upturned side flanges of the insert to provide further support. The shielding means thus prevents a bird from pecking downwardly generally in the diagonal direction shown by the arrow in FIG. 3, so that eggs 44 can be conveyed past the individual nests without being damaged. Panel 42 has a pair of legs 46 which straddle opening 16. Central cut-out 48 generally corresponds with opening 16 to allow eggs to freely roll out of the nest. The novel shielding device has been found to serve as excellent protection of the conveyed eggs from birds in the nest.

The shield also prevents parts of a dead bird, especially legs, from protruding out opening 16 onto conveyor 30. The bird's body can only get up to the outer edge of panel 40. Thus, the feet cannot readily extend from the nest.

The device can be manufactured from relatively inexpensive sheet materials by high speed forming techniques by die cutting opening 48 and bending the metal on a conventional brake. It is especially adaptable in its removable form shown when utilized with the contoured insertable nest bottom. It does not detract from the quick assembly and dis-assembly features of this type of nest.

Various obvious modifications of the nest structure and shielding means within the principles taught may occur to those in the art upon studying the foregoing specification in the form of the invention illustrated. Such obvious modifications are deemed part of this invention, which is to be limited only by the scope of the appended claims and the reasonably equivalent structures thereto.

I claim:

1. In a nest housing, a nest having an egg roll-out opening; a contoured nest insert bottom having upturned side portions, and a bottom surface sloping toward said opening; a generally V-shaped shield means in said nest, with one leg of said V being slidably inserted between said insert and the wall of said nest housing containing said opening; and the other leg of said V extending diagonally inwardly and downwardly of said nest over said opening to thereby prevent access of a bird in said nest to said opening, while allowing eggs to roll thereunder and out said opening.

2. In a nest housing, a nest having an egg roll-out opening; a contoured nest insert bottom having upturned side portions, and a bottom surface sloping toward said opening; and a generally V-shaped shield means being removably held in said nest by said insert bottom, one leg of said V being slidably inserted between said insert and the wall of said nest housing containing said opening, and including an opening corresponding to said roll-out opening to pass eggs therethrough; and the other leg of said V extending diagonally inwardly and downwardly of said nest over said opening; and the inner edge of said other leg resting upon said side portions to thereby prevent access of a bird in said nest to said opening while allowing eggs laid in said nest to roll out said opening.

3. In a nest housing, a nest having an egg roll-out opening; a contoured nest insert bottom having upturned side portions, and a bottom surface sloping toward said opening; removable shield means in said nest including a shield panel extending inwardly of said nest; the innermost edge of said shield panel resting on said upturned side portions; said shield means also including vertical support means slidably inserted between said insert and the wall of said nest containing said opening, and having portions straddling said opening to allow passage of eggs through said opening while providing support to said shield means.

References Cited in the file of this patent
UNITED STATES PATENTS

| | | |
|---|---|---|
| 2,564,207 | Marshall | Aug. 14, 1951 |
| 2,694,381 | Kaegebein | Nov. 16, 1954 |
| 2,695,006 | Tellefson | Nov. 23, 1954 |
| 2,827,014 | Kaegebein | Mar. 18, 1958 |
| 2,992,628 | McDaniel | July 18, 1961 |